C. NELSON & H. J. AXT.
COFFEE MACHINE.
APPLICATION FILED SEPT. 8, 1909.
1,026,405.
Patented May 14, 1912.
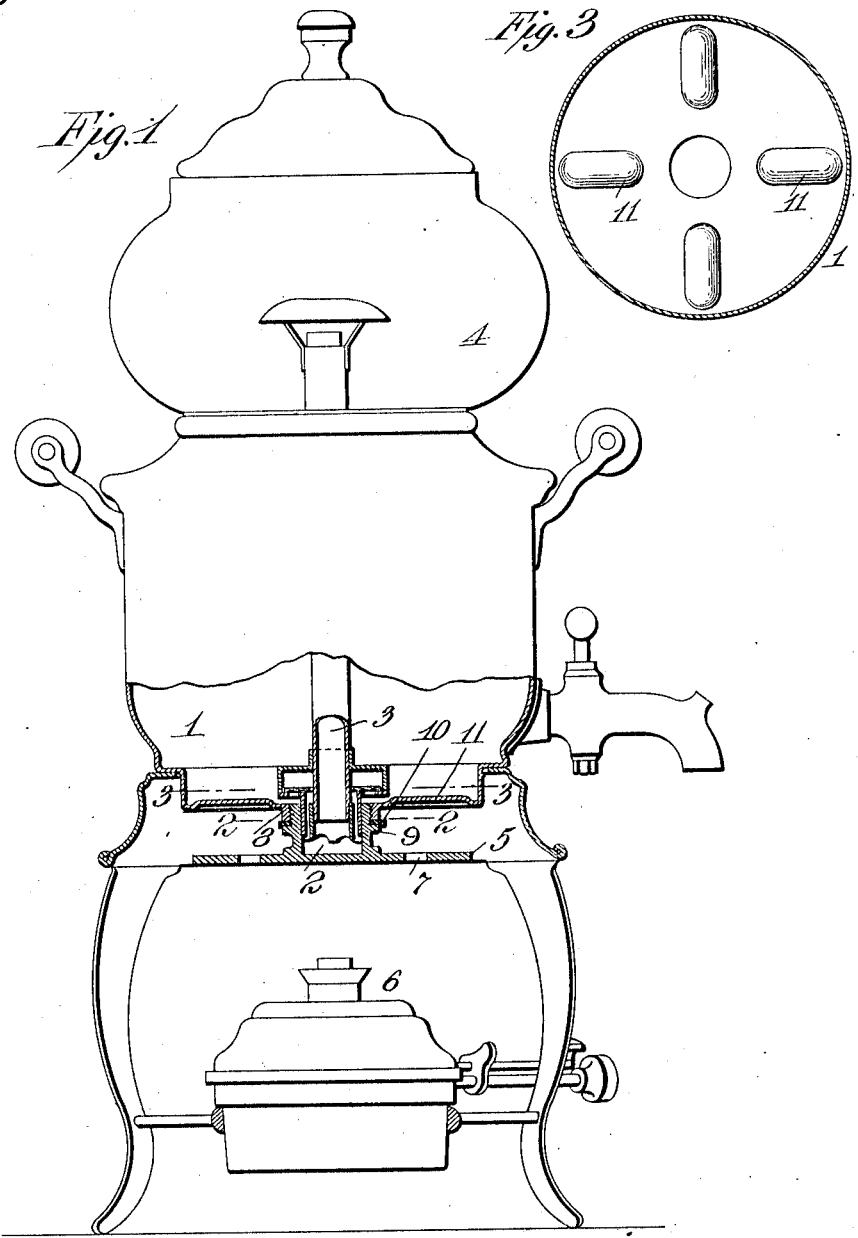
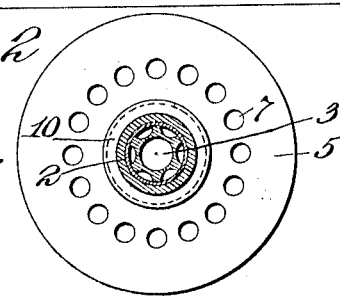
Witnesses:
Inventor
Charles Nelson
Harry J. Axt

UNITED STATES PATENT OFFICE.

CHARLES NELSON, OF NEW YORK, N. Y., AND HARRY J. AXT, OF NEWARK, NEW JERSEY, ASSIGNORS TO S. STERNAU & CO., OF BROOKLYN, NEW YORK, A COPARTNERSHIP.

COFFEE-MACHINE.

1,026,405.      Specification of Letters Patent.      Patented May 14, 1912.

Application filed September 8, 1909. Serial No. 516,646.

*To all whom it may concern:*

Be it known that we, CHARLES NELSON, a citizen of the United States, and a resident of the city of New York, borough of Brooklyn, county of Kings, State of New York, and HARRY J. AXT, a citizen of the United States, and resident of Newark, county of Essex, State of New Jersey, have invented certain new and useful Improvements in Coffee-Machines, of which the following is a specification.

Our invention relates to improvements in coffee machines of the type invented by Charles Nelson and disclosed in the application for patent, Serial No. 399804, filed October 30, 1907.

The accompanying drawings illustrate one embodiment of the invention.

Figure 1 is a view partly in section of a coffee machine embodying our invention; Fig. 2 is a section on the line 2—2 of Fig. 1, looking downward, and showing the heat radiating plate; Fig. 3 is a section on the line 3—3 of Fig. 1, looking downward showing the bottom of the inside of the receptacle.

In all of the views like parts are designated by the same reference characters.

In the type of machine forming the subject matter of this application, the liquid is contained in a receptacle 1, and is heated in a small chamber 2, such chamber depending from the middle of the bottom of the receptacle 1 and communicating therewith. A fountain 3 lies within the chamber and passes up through the receptacle; its upper end extending above the usual foraminous coffee holder (not shown) and lying within the globe 4 in the customary manner. The liquid contained in the chamber 2 is subjected to a source of extraneous heat, and is driven up through the fountain 3 while liquid at a lower temperature enters the chamber through the fountain, and takes the place of the heated liquid ejected. The present invention relates to improvements and details of such form of coffee machine.

The first detail has to do with the chamber 2. This chamber is provided at its bottom with an integral plate 5. This plate 5 lies above the lamp or heating device 6. Its purpose is to form a large surface for action for the flame, so that the heat will not be wasted, and also acts as a shield to keep the flame from coming into actual contact with the bottom of the receptacle. The heat is conducted through the plate to the bottom of the chamber 2. A row of small openings 7 is provided in the plate, such row being preferably circular as shown, and lying about half way between the chamber and the periphery of the plate. We find that by providing holes or openings 7 within the plate, a great increase of efficiency results. The flame from the lamp 6 is steadied, and is not liable to be deflected to one side by slight drafts; on the contrary, it rises in a more solid column, flowing regularly and uniformly over the outer edge of plate, and partly flowing through the openings 7. The edges of the openings, *i, e.*, the vertical walls, equal in height to the thickness of the plate, provide additional surfaces for absorbing heat, thereby increasing the efficiency of the plate. The flame also, to some extent, engages with the upper sides of the plate. We find that the flame passing through these openings 7 does not come in contact with the bottom of the receptacle 1, it being one purpose of the plate to prevent contact of the flame with the bottom of such receptacle. The sizes of the openings may be varied, and their number may be varied, but we prefer to make them the form of round holes, and arranged in circular form as shown in Fig. 2.

The second feature of our invention relates to the connection between the chamber 2 and the receptacle 1. As shown in the drawings, the bottom of the receptacle is provided with the threaded sleeve 8. The upper edge of this sleeve is flush with the inside of the bottom of the receptacle, so that the bottom of the inside of the receptacle is left clear for cleaning. The upper portion of the outside of the chamber, one of circular cross section being shown, is threaded. Below the threads is a shoulder 9. The screw threads on the chamber, and upon the sleeve, constitute a means for connecting the chamber to the receptacle. The chamber may be rotated by grasping the plate 5, the latter being of sufficient size to give enough purchase to unscrew the chamber from the sleeve. The particular improvement which we have made consists in interposing an asbestos washer 10 between the shoulder 9 and the bottom of the threaded sleeve 8. The diameter of the shoulder is preferably the same as that of the sleeve. The washer we prefer to make somewhat wider, as shown in Fig. 1. This washer may be clamped between the sleeve and shoulder and a perfectly liquid tight joint thereby produced. The tightness of the joint is improved by the extension of the washer beyond the sleeve and shoulder, as shown. By making the washer of asbestos it can extend in this manner and still be unaffected by any chance flame that may come in contact with it.

The third feature of our invention resides in the means for strengthening the bottom of the receptacle. We have found that the connection between the sleeve 8 and bottom of a receptacle is liable to be loosened,—that the bottom of the receptacle is liable to be distorted from accidental blows given to the plate 5, and also by strains caused by screwing and unscrewing the chamber from the receptacle. For the purpose of strengthening the bottom of the receptacle, we provide radial corrugations 11 in the latter. These corrugations are preferably 4 in number, as shown in Fig. 3, and extend substantially from the sleeve 8 to the outer portion of the bottom of the receptacle, as shown. The corrugations are preferably made by striking up the material of the bottom. These corrugations greatly increase the strength of the bottom of the receptacle, and at the same time provide a structure in which there are no interstices, and which can be readily cleaned.

In accordance with the provisions of the patent statutes, we have described the principle of our invention, together with the apparatus which we now consider to represent the best embodiment thereof; but we desire to have it understood that the apparatus shown is merely illustrative and that the invention can be carried out in other ways.

Having now described our invention, what we claim as new and desire to secure by Letters Patent is:—

1. In a coffee machine, the combination with a receptacle and a heating chamber, of less diameter than the receptacle, secured to the bottom thereof and communicating therewith, of a plate secured to the bottom of the chamber, said plate being of greater diameter than the chamber, and perforations in the plate beyond the sides of the chamber.

2. In a coffee machine the combination with the receptacle, chamber and lamp, of a plate connected with the chamber above the lamp and extending below the bottom of the receptacle, said plate having a row of circularly disposed holes therethrough.

3. A coffee machine having a receptacle, with a sleeve in the bottom thereof, said bottom having radiating corrugations, which extend from the sleeve to the periphery of the bottom in combination with a chamber depending from the sleeve.

This specification signed and witnessed this 27th day of August, 1909.

CHARLES NELSON.
HARRY J. AXT.

Witnesses:
LEONARD H. DYER,
JOHN L. LOTSCH.

---

Copies of this patent may be obtained for five cents each, by addressing the "Commissioner of Patents, Washington, D. C."